United States Patent [19]

Baird

[11] Patent Number: 4,939,663
[45] Date of Patent: Jul. 3, 1990

[54] ELEVATION MAP-REFERENCED MECHANISM FOR UPDATING VEHICLE NAVIGATION SYSTEM ESTIMATES

[75] Inventor: Charles A. Baird, Melbourne Beach, Fla.

[73] Assignee: Harris Corporation, Melbourne, Fla.

[21] Appl. No.: 177,325

[22] Filed: Apr. 4, 1988

[51] Int. Cl.$^5$ .............................................. G06F 15/50
[52] U.S. Cl. ................................... 364/449; 364/443; 364/457; 342/64
[58] Field of Search ............... 364/443, 449, 450, 460, 364/454, 457, 571.04; 73/178 R; 342/62, 63, 64

[56] References Cited

U.S. PATENT DOCUMENTS

| | | | |
|---|---|---|---|
| 4,144,571 | 3/1979 | Webber | 342/63 |
| 4,179,693 | 12/1979 | Evans et al. | 364/443 |
| 4,495,580 | 1/1985 | Keearns | 364/450 |
| 4,514,733 | 4/1985 | Schmidtlein et al. | 342/64 |
| 4,520,445 | 5/1985 | Keearns | 364/450 |
| 4,584,646 | 4/1986 | Chan et al. | 364/443 |

Primary Examiner—Gary Chin
Attorney, Agent, or Firm—Antonelli, Terry & Wands

[57] ABSTRACT

A drift correction mechanism for a vehicle (e.g. aircraft) navigation system makes use of a digital map data base, in order to correct for errors in position estimates, so that the estimated flight path of the aircraft will more closely track its actual flight path, and thereby effectively compensate for the long term error to which the navigation system is subjected. During the flight, altimeter readings are periodically carried out in order to generate elevation values that are representative of the actual elevation of the terrain over which the aircraft is flying. These elevation values are then used as inputs to a digital map database, from which elevation profile contour lines of respective elevation values may be derived. At the time that a respective altimeter reading is effected, the position estimate output of the aircraft's navigation system is also sampled. This position estimate is then compared with the contour line that passes through the actual position of the aircraft at the time the altimeter measurement is made. The separation between the navigation system's position estimate and that geographical position on the contour line which is closest to the position estimate is then used as a correction factor to update the position estimate to a set of corrected geographical coordinates that more closely approximate the coordinates of the actual flight path of the aircraft.

6 Claims, 2 Drawing Sheets

ELEVATION MAP-REFERENCED MECHANISM FOR UPDATING VEHICLE NAVIGATION SYSTEM ESTIMATES

FIELD OF THE INVENTION

The present invention relates to vehicle (e.g. airborne) navigation systems, and is particularly directed to a mechanism for correcting for drift and thereby improving the accuracy of position estimates produced by such a system, in accordance with elevation information periodically accessed from a digital map database.

BACKGROUND OF THE INVENTION

Airborne vehicle nap-of-the-earth (NOE) flight requires precise pilot control to avoid obstacles and elevated terrain. While the pilot normally relies on good visibility to perform the NOE function, requirements exist for NOE flight during periods of less than good visibility (poor weather or nighttime conditions) and (pilotless) automatic guidance. Airborne navigation systems are typically of the dead reckoning (DR) variety, usually based upon doppler radar and compass inputs. Although these navigation schemes offer excellent short term guidance capability, they exhibit long term position error growth, so that an in-flight correction procedure, such as periodic updating of the dead reckoning navigation system, is necessary. For this purpose, terrain correlation techniques, such as TERCOM and SITAN navigation signal processing schemes, have been proposed, as described in my copending patent application Ser. No. 864,843 entitled "MAP-AIDED NAVIGATION SYSTEM EMPLOYING TERCOM-SITAN SIGNAL PROCESSING", filed May 20, 1986, and assigned to the assignee of the present application now U.S. Pat. No. 829,304, issued May 9, 1989. As described therein, by taking advantage of a digital map database, it is possible to provide a computationally efficient navigation system, that improves upon conventional TERCOM and SITAN signal processors, by using elevation and slope data accessed from the digital map database, in conjunction with altimeter inputs, to provide parameter control information for a correlation/modified Kalman filter processor.

SUMMARY OF THE INVENTION

In accordance with the present invention, there is provided a further improvement in (airborne) vehicle navigation systems that makes use of such a digital map data base, in order to correct for the error (drift) inherent in a dead reckoning vehicle navigation system, such as an inertial navigation system (INS). Pursuant to the invention, position estimates that are generated by the aircraft's inertial navigation system are periodically adjusted to geographical coordinates that more closely track the actual flight path of the aircraft and thereby effectively compensate for the long term error to which the navigation system is subjected. To this end, during the flight, altimeter readings are periodically carried out in order to generate elevation values that are representative of the actual elevation of the terrain over which the aircraft is flying. These elevation values are then used as inputs to a digital map database, from which elevation profiles or contour lines of respective elevation values may be derived. At the time that a respective altimeter reading is effected, the position estimate output of the aircraft's navigation system is also sampled. This position estimate is then compared with the positions along the contour line that passes through the actual position of the aircraft at the time the altimeter measurement is made. The separation between the navigation system's position estimate and that geographical position on the contour line which is closest to the position estimate is then used as a correction factor to update the position estimate to a set of corrected geographical coordinates that more closely approximate the coordinates of the actual flight path of the aircraft. Because of the tendency of the position error in output of the navigation system to gradually increase or grow with time, a running total of the position estimate offsets or correction values is maintained. At each periodic update the respective magnitudes of the accumulated separation values are combined with the corresponding coordinate outputs of the inertial navigation system, to yield the sought-after corrected position updates.

DETAILED DESCRIPTION

Figure 1:
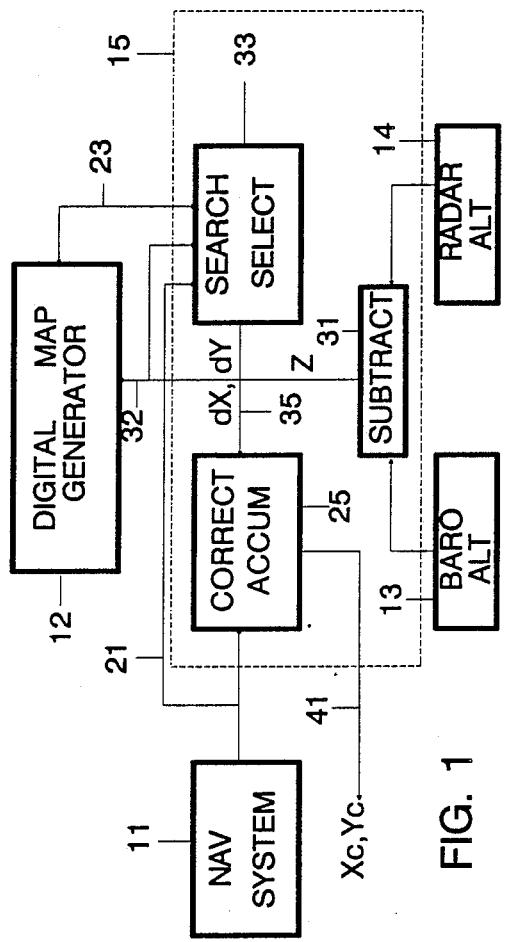
FIG. 1 is a block diagram of an elevation map-referenced mechanism for updating vehicle navigation system estimates.

Referring now to FIG. 1 of the drawings, there is illustrated a block diagram of an elevation map-referenced mechanism for updating vehicle position estimates produced by the vehicle's navigation system in accordance with the present invention. As shown in FIG. 1, the navigation hardware includes a navigation unit 11, a digital map generator 12, barometric and radar altimeters 13 and 14, respectively, and a navigation position estimate update processor 15. For purposes of the description to follow, it will be assumed that the vehicle in which the present invention is employed is an aircraft, although it is to be observed that the invention is not limited to use in any specific type of vehicle. As part of the aircraft's flight control system navigation unit 11 may comprise a conventional INS or doppler velocity system which supplies altitude and position data over output link 21 for in-flight aircraft guidance control. Link 21 is coupled to digital map generator 12 and to a correction accumulator mechanism 25 within position estimate update signal processor 15, so that the estimated position of the aircraft may be compared with a map-referenced elevation contour value for the purpose of adjusting the navigation estimate to a set of geographical coordinate values that more closely approximate the true position of the aircraft along its flight path.

Digital map generator 12 may be of the type described in copending U.S. Pat. application Ser. No. 168,437 filed Mar. 15, 1988, which is a cont. of U.S. Pat. Application Ser. No. 641,179 filed Aug. 15, 1984, (now abandoned) which is a continuation of U.S. Pat. application Ser. No. 224,742 filed Jan. 13, 1981 (abandoned) by Paul Beckwith et al., entitled "Digital Map Generator and Display System" and assigned to the assignee of the present application. The hardware of the digital map generator described in that application supplies elevation profile data over link 23 to position estimate update signal processor 15, in response to the altitude and position data supplied from navigation unit 11 over link 21.

Position estimate update signal processor 15 preferably comprises a commercially available microprocessor and associated memory for execution of each of the selection/search (block 33), correction accumulation (block 25) and elevation (block 31) functions. For this purpose, position estimate update signal processor 15 receives elevation representative data Z generated in accordance with the outputs of altimeters 13 and 14. Namely, each of altimeters 13 and 14 is coupled to a subtraction mechanism 31 within position estimate update signal processor 15 for the purpose of deriving the elevation of the terrain over which the aircraft is flying at any particular time. The distance from the aircraft to the surface beneath it, as measured by radar altimeter 14, is subtracted from the output of barometric altimeter 13 to provide, on link 32, a signal Z representative of the height or elevation of the terrain over which the aircraft is flying. This elevation signal Z is supplied to a search/selection logic mechanism 33 within position estimate update signal processor 15 and to digital map generator 12. On the basis of the position estimate data supplied over link 21 and the elevation data Z supplied over link 32 digital map generator 12 outputs, over link 23 to search/selection mechanism 33 within position estimate update signal processor 15, data representative of that elevation profile contour line which passes through the actual position of the aircraft at the time the altimeter measurement (corresponding to elevation Z) is made. Within position estimate update signal processor 15, search/selection mechanism 33 compares the elevation profile data on link 23 with the current corrected position estimate supplied over link 41 from correction/accumulator 25. Using a shortest distance procedure, search/selection mechanism 33 then locates that position on the elevation profile supplied by digital map generator 12 that is closest to the current position estimate produced by navigation system 11 (and adjusted by the accumulation of previous correction values stored by correction accumulator 25). The separation between these two positions is then defined as new correction data to be added to that currently stored in correction accumulator 25, so that the updated position output on link 41 will more closely approximate the actual position of the aircraft along its flightpath.

OPERATION

Figure 2:
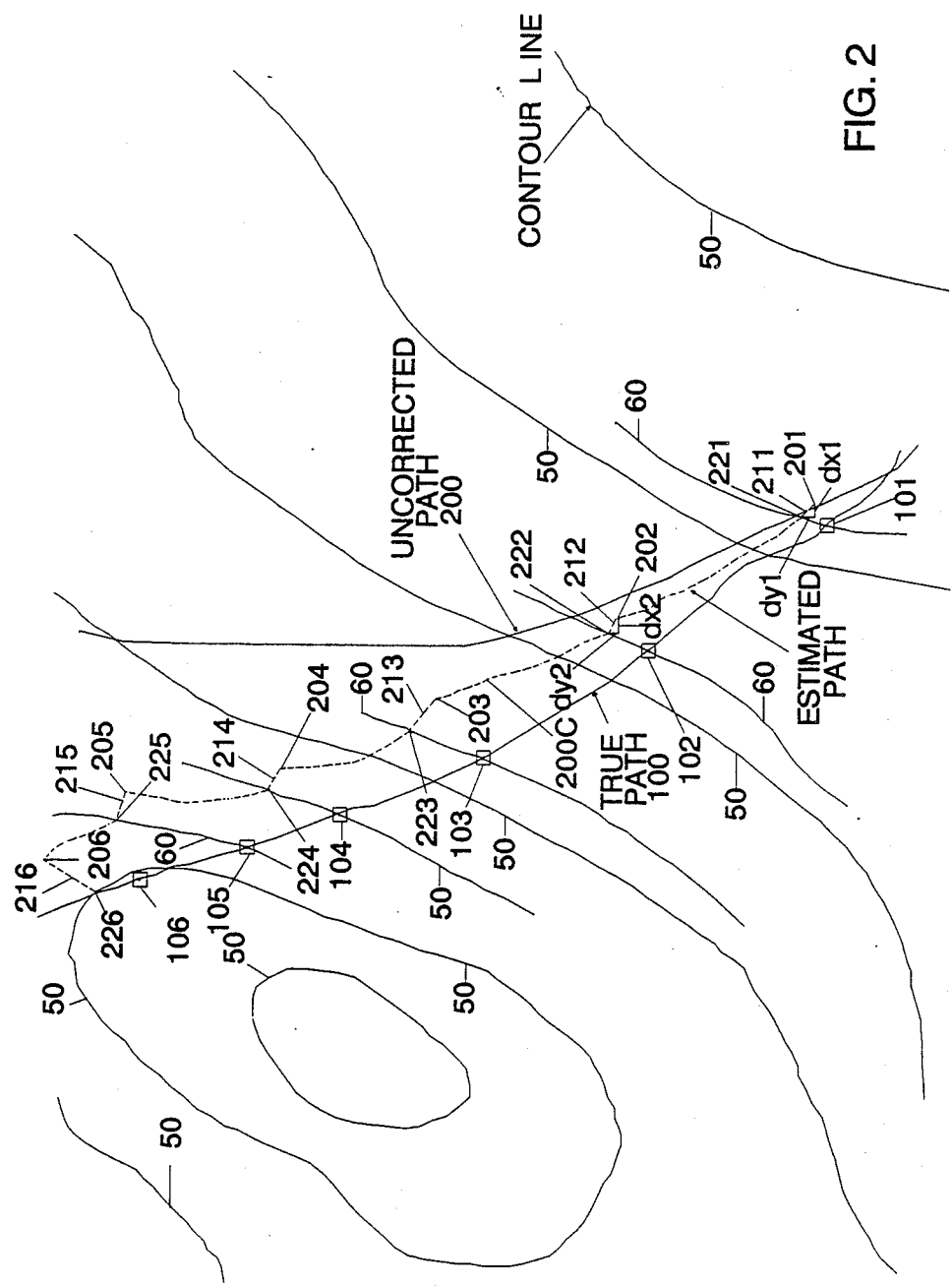
FIG. 2 diagrammatically illustrates the projection of vehicle travel path profiles on a terrain contour map.

To facilitate an understanding of the operation of the present invention, attention is directed to FIG. 2 of the drawings which diagrammatically illustrates the projection of vehicle travel path profiles on a terrain contour map. The terrain contour map itself is shown as comprising a series of elevation profile contour lines 50, each of which passes through the same respective elevation value within a geographical area of interest. In the example of FIG. 2, the terrain is shown as undulating or 'rough', with adjacent elevation profile contour lines being associated with increments of 50 meter separation.

Projected onto the elevation profile contour map is a travel path profile 100 corresponding to the projection of the actual flight path of the aircraft on the terrain beneath it. At successive increments in time along this flight path, denoted by squares 101 . . . 106, altimeter measurements are carried out and elevation profile data is read out of the digital map generator 12. As shown in FIG. 2, the actual elevations of the terrain over which the vehicle is flying at the successive points in time 101-106 at which the altimeter measurements are sampled do not necessarily fall on the 50 meter increment elevation profile contour lines. However, the digital map generator 12 provides the capability of elevation interpolation, so that it produces an associated set of interpolated elevation profile contour lines 60 which pass through those locations 101-106 along the actual flight path 100 of the aircraft where altimeter measurements are carried out.

At the same time, the vehicle navigation unit 11 generates an output on link 21 representative of a estimate of the position of the vehicle. For sampling location 101 along the actual flight path 100 of the vehicle, vehicle navigation unit 11 produces a position output representative of the location 201 along an estimated flight path 200 which, as shown in FIG. 2, gradually diverges or departs from the actual flight path of the vehicle. This departure of the estimate flight path from the actual flight path of the vehicle results from the inherent drift in the operation of the navigation unit 11, and it is this drift which the invention corrects.

For the initial elevation measurement point 101 along the actual flight path 100 of the aircraft, the output of radar altimeter 14 is subtracted from the output of barometric altimeter 13 (subtraction mechanism 31), to produce an actual elevation measurement value which is supplied over link 32 to the digital map generator 12 and to the search/selection mechanism 3 within position estimate update signal processor 15. Assuming that the system was accurately initialized to its true geographical position at the point of aircraft departure, and the aircraft has been flying for some length of time, then the position estimate produced by the output of the vehicle navigation unit 11 will be slightly offset from the actual flight path of the vehicle. This offset or divergence of the estimated flight path, shown by path 200 in FIG. 2, results in navigation unit 11 supplying an erroneous estimate reading on link 21. This erroneous position estimate is denoted at point 201 on path 200 in FIG. 2. The respective x,y coordinates of the position estimate along path 200 on link 21 are supplied to search/selection mechanism 33 and to a correction accumulator mechanism 25 within position estimate update signal processor 15. As pointed out previously, search/selection mechanism 33 also receives data representative of the elevation profile contour line 60 which passes through location 101 whereat the altimeter readings are sampled. Using a conventional shortest distance procedure, search/selection mechanism 33 locates that point along elevation profile contour line 60 that is closest to point 201 on estimated flight path 200. This shortest distance is denoted by line 211 between point 201 on estimated path 200 and point 221 (the closest point) on elevation profile contour line 60. The respective dx,dy components of line 211 are supplied over link 35 from search/selection mechanism 33 to correction accumulator 25. Correction accumulator 25 adds the dx,dy offset values to the position estimate data supplied over link 21 from navigation unit 11 and supplies corrected coordinate estimates $x_c, y_c$ over link 41. These adjusted estimates $x_c, y_c$ are the coordinates of point 221 along a corrected estimated path 200C.

As the aircraft continues to fly along its actual path 100, the outputs of altimeter 13 and 14 are again sampled at the next position estimate update time (at elevation measurement point 102) and the above-described operation is again carried out. At this time, however, correction accumulator 25 currently stores the previous coordinate offsets dxl,dyl. These offsets adjust the output from the navigation unit 11, such that at the point in time in which the next estimate is produced (corresponding to the position of the aircraft at elevation measurement point 102 along flight path 100) the estimate value produced on link 41 will correspond to point 202 on corrected flight path 200C. Search/selection mechanism 33 finds the shortest distance between contour line 60 (which passes through point 102 on flight path 100) and the current position estimate (point 202 on corrected flight path 200C). The respective dx2,dy2 components of this shortest path line 212 are then supplied as correction updates over link 35 to correction accumulator 25, so that the output of vehicle navigation unit 11 is further modified to locate the position estimate at point 222 on corrected estimated path 200C. In other words, correction accumulator 25 now contains the sum of correction values dx1,dx2 and dy1,dy2.

As the aircraft continues to fly along its actual flight path 100, position information is periodically updated (as denoted by elevation measurement points 103, 104, 105, 106 . . .), thereby providing a periodic adjustment or correction of the position estimate data generated by navigation unit 11 and injecting a periodic incremental offset into the corrected path 200C. As a consequence, the corrected path 200C forms a quasi-step wise approximation of the actual flight path 100 and thereby corrects for the drift of the output of the navigation unit 11, which would otherwise indicate that the vehicle is travelling along diverging path 200.

As will be appreciated from the foregoing description, by taking advantage of the capability of a digital map data base to supply elevation contour information based upon elevation measurements carried out during the course of travel of a vehicle, correction for the deviation or drift in the vehicle's dead reckoning navigation system an be carried out using a relatively simple adjunct to the vehicle guidance system. As a consequence, position estimates that are generated by the aircraft's inertial navigation system are periodically adjusted to geographical coordinates that more closely track the actual flight path of the aircraft and thereby effectively compensate for the long term error to which the navigation system is subjected.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a vehicle navigation system in which signals representative of an estimate of the position of said vehicle relative to terrain over which a vehicle is traveling are produced by said vehicle navigation system, a method for adjusting said signals to an estimate of the position of said vehicle that more closely tracks the actual travel path of sad vehicle comprising:
    (a) measuring the elevation of the terrain over which said vehicle is travelling;
    (b) deriving from a terrain map data base a terrain contour line that follows an elevation profile containing the elevation measured in step (a);
    (c) deriving from said navigation system signals representative of the estimated position of said vehicle at the time the elevation over which said vehicle is travelling is measured in step (a);
    (d) measuring the separation between the estimated position of said vehicle derived in step (c) and the closest position thereto on said terrain contour line derived in step (b); and
    (e) adjusting said signals representative of the estimated position of said vehicle in accordance with the separation measured in step (d), so as to produce an updated estimate of the position of said vehicle that more closely approximates the actual position of said vehicle at the time that the elevation measurement in step (a) is carried out.

2. A method according to claim 1, wherein steps (a)–(d) are carried out for successive positions along the travel path of said vehicle, and step (e) comprises accumulating the successive separations measured in step (d) and adjusting successive ones of said signals representative of the estimate of the position of said vehicle in accordance with the accumulated separation.

3. A method according to claim 2, wherein steps (a)–(e) are carried out periodically during the travel of the vehicle.

4. For use with a vehicle navigation system in which position estimate output signals representative of an estimate of the position of a vehicle to terrain over which said vehicle is travelling are produced by said navigation system, an arrangement for adjusting said output signals to be representative of an estimate of the position of said vehicle that more closely tracks the actual travel path of said vehicle comprising:
    first means for measuring the elevation of the terrain over which said vehicle is travelling and generating first signals representative of said elevation;
    second means, responsive to said first signals generated by said first means, for deriving from a terrain map data base second signals representative of a terrain contour line that follows an elevation profile containing the elevation represented by said first signals;
    third means, coupled to said navigation system, for deriving therefrom third signals representative of the estimated position of said vehicle at the time its elevation is measured by said first means;
    fourth means, coupled to said second and third means, for generating fourth signals representative of the separation between estimated position of said vehicle as represented by said third signals and the closest position thereto on said terrain contour line as represented by said second signals; and
    fifth means, coupled to said third and fourth means, for adjusting said third signals in accordance with said fourth signals, so as to produce said output signals representative of an estimate of the position of said vehicle that more closely approximates the actual position of said vehicle at the time that said first means carries out said elevation measurement.

5. An arrangement according to claim 4, wherein said first through fourth means generate said first through fourth signals for successive positions along the travel path of said vehicle and said fifth means includes means for accumulating successive ones of said fourth signals and adjusting successive ones of said third signals representative of the estimate of the position of said vehicle in accordance with the accumulated fourth signals.

6. An arrangement according to claim 5, wherein said first means carries out said elevation measurement and generates said first signals periodically.

* * * * *